(12) United States Patent
Fuehrer et al.

(10) Patent No.: US 12,142,881 B2
(45) Date of Patent: Nov. 12, 2024

(54) CHARGING SOCKET WITH INTERFACE

(71) Applicant: PHOENIX CONTACT E-Mobility GmbH, Schieder-Schwalenberg (DE)

(72) Inventors: Thomas Fuehrer, Blomberg (DE); Robert Babezki, Steinheim (DE); Witalij Knaub, Aerzen (DE); Dennis Sprenger, Lemgo (DE)

(73) Assignee: PHOENIX CONTACT E-MOBILITY GMBH, Schieder-Schwalenberg (DE)

( * ) Notice: Subject to any disclaimer, the term of this patent is extended or adjusted under 35 U.S.C. 154(b) by 0 days.

(21) Appl. No.: 17/462,060

(22) Filed: Aug. 31, 2021

(65) Prior Publication Data

US 2022/0077638 A1 Mar. 10, 2022

(30) Foreign Application Priority Data

Sep. 9, 2020 (DE) .................. 102020123476.7

(51) Int. Cl.
| | | |
|---|---|---|
| *H01R 13/74* | (2006.01) | |
| *B60L 53/16* | (2019.01) | |
| *H01R 12/57* | (2011.01) | |
| *H01R 13/03* | (2006.01) | |
| *H01R 13/502* | (2006.01) | |
| *H01R 13/627* | (2006.01) | |
| *H01R 27/02* | (2006.01) | |

(52) U.S. Cl.
CPC ............ *H01R 13/741* (2013.01); *B60L 53/16* (2019.02); *H01R 12/57* (2013.01); *H01R 13/03* (2013.01); *H01R 13/502* (2013.01); *H01R 13/6275* (2013.01); *H01R 27/02* (2013.01); *H01R 2201/26* (2013.01)

(58) Field of Classification Search
CPC ...... H01R 31/06; H01R 33/92; H01R 25/006; H01R 25/003; H01R 13/741; H01R 13/502; H01R 13/03; H01R 13/6275; H01R 27/02; H01R 12/57; H01R 2201/26; B60L 53/16
USPC .................... 439/638, 639, 650, 654, 908
See application file for complete search history.

(56) References Cited

U.S. PATENT DOCUMENTS

| 2,215,712 | A | * | 9/1940 | Peck | ............ | H01R 25/006 |
| | | | | | | 439/650 |
| 4,530,551 | A | * | 7/1985 | Benasutti | ............ | H01R 12/58 |
| | | | | | | 439/78 |
| 4,618,196 | A | * | 10/1986 | Muzslay | ............ | H01R 31/06 |
| | | | | | | 439/654 |
| 6,508,679 | B2 | * | 1/2003 | Han | ............ | H05B 6/6426 |
| | | | | | | 439/934 |

(Continued)

FOREIGN PATENT DOCUMENTS

| CN | 210897752 U | 6/2020 |
| DE | 102013108484 A1 | 2/2015 |

(Continued)

*Primary Examiner* — Gary F Paumen
(74) *Attorney, Agent, or Firm* — LEYDIG, VOIT & MAYER, LTD.

(57) ABSTRACT

A plug socket includes: a first connector face for connecting a plug for transmitting electrical energy and/or electrical signals via at least one contact element; and a second connector face having at least one contact assembly which is fastenable or is detachably fastenable thereto, and which has the at least one contact element, and/or via which the electrical energy and/or the electrical signals is transmittable by at least one electrical line.

18 Claims, 9 Drawing Sheets

(56) References Cited

U.S. PATENT DOCUMENTS

| | | | | |
|---|---|---|---|---|
| 7,278,891 | B2* | 10/2007 | Cvasa | H01R 13/187 |
| | | | | 439/852 |
| 8,721,352 | B2* | 5/2014 | Tsang | H01R 12/52 |
| | | | | 439/78 |
| 10,843,582 | B2* | 11/2020 | Feldner | H01R 13/6275 |
| 2015/0229055 | A1 | 8/2015 | Fukushima et al. | |
| 2016/0039298 | A1 | 2/2016 | Herzog | |
| 2020/0185847 | A1 | 6/2020 | Feldner et al. | |

FOREIGN PATENT DOCUMENTS

| | | |
|---|---|---|
| DE | 202015009802 U1 | 3/2020 |
| DE | 102018124821 A1 | 4/2020 |
| EP | 3644456 A1 | 4/2020 |
| JP | 2014099256 A | 5/2014 |
| JP | 2020098776 A | 6/2020 |

\* cited by examiner

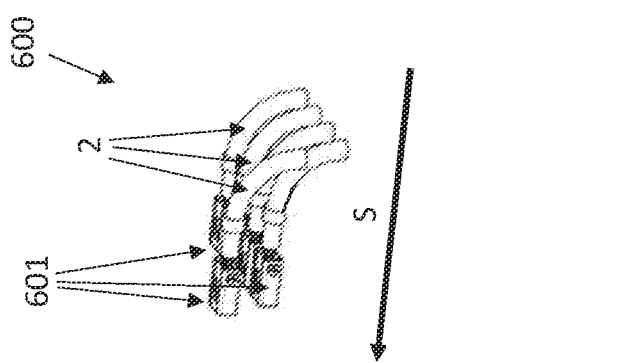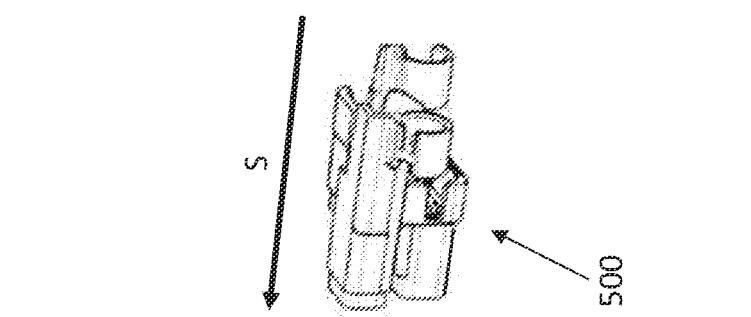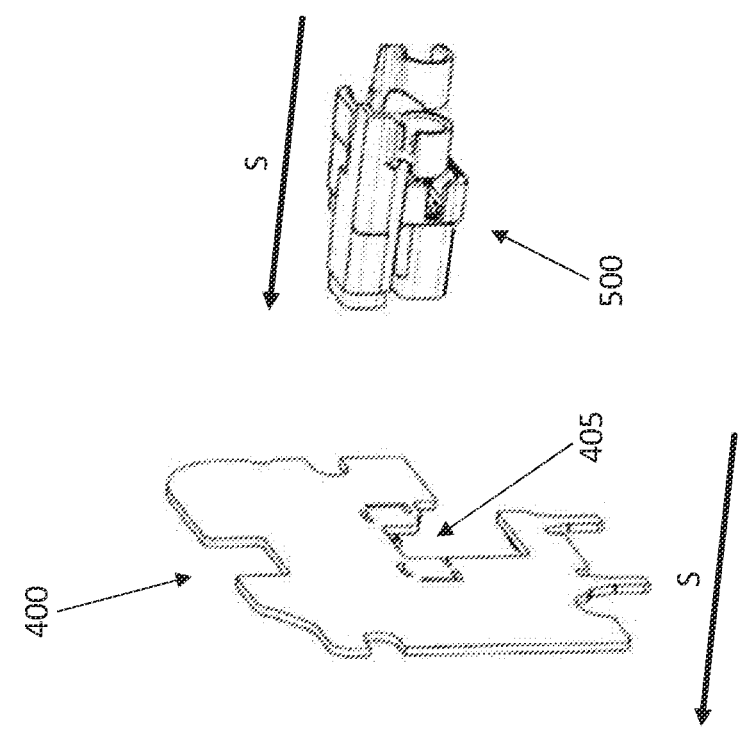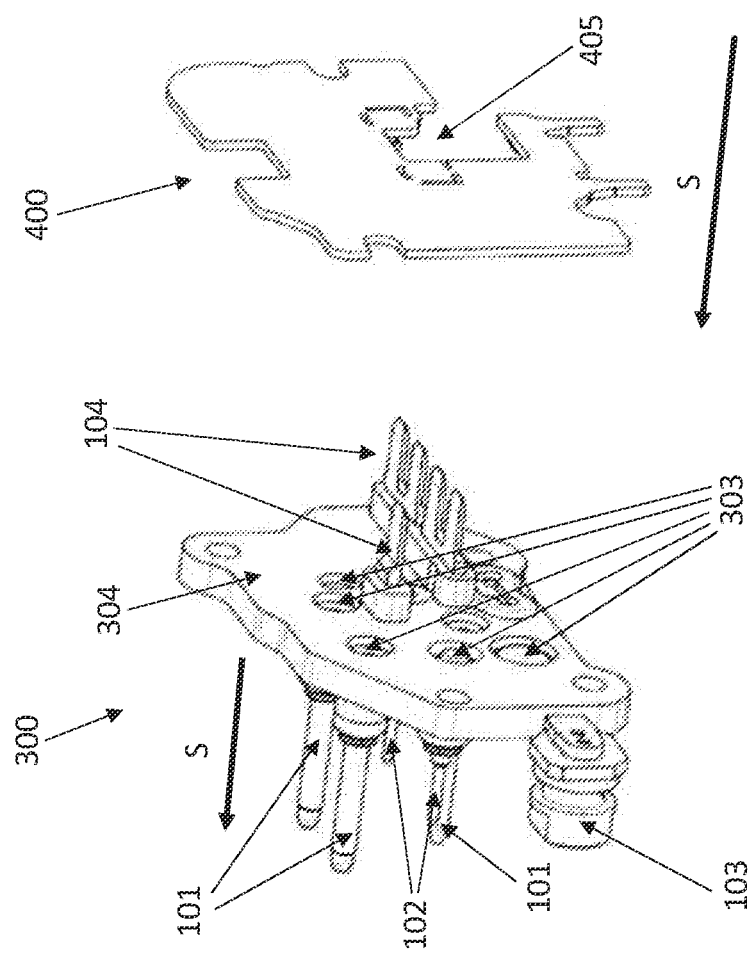

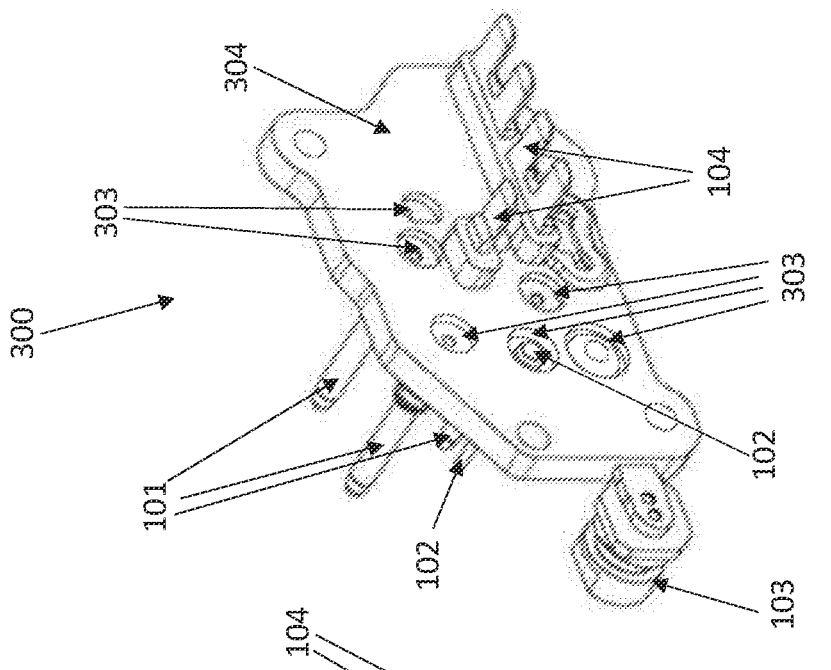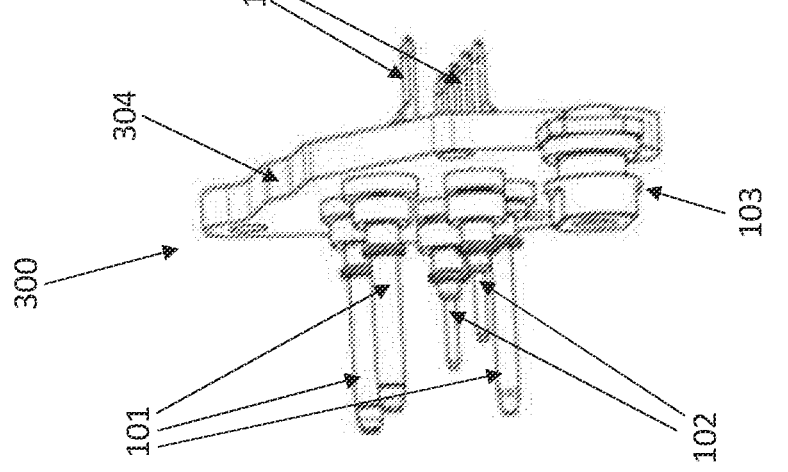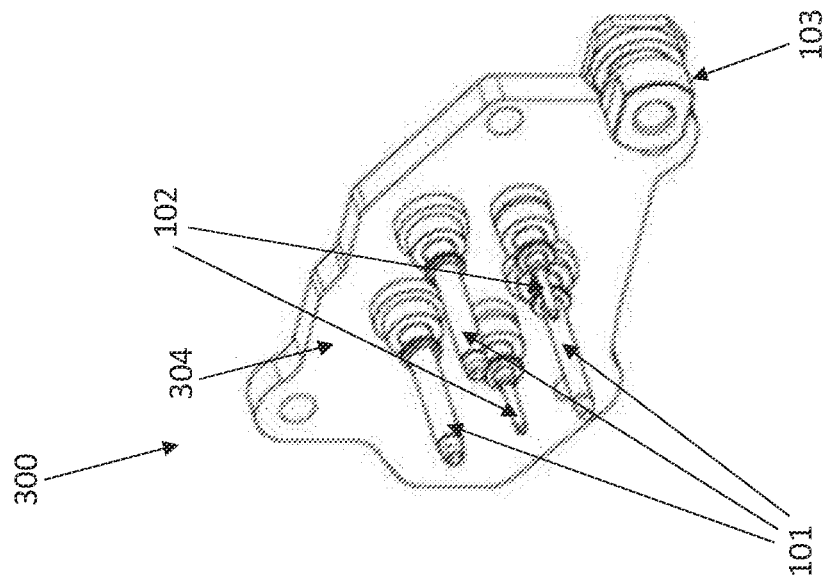

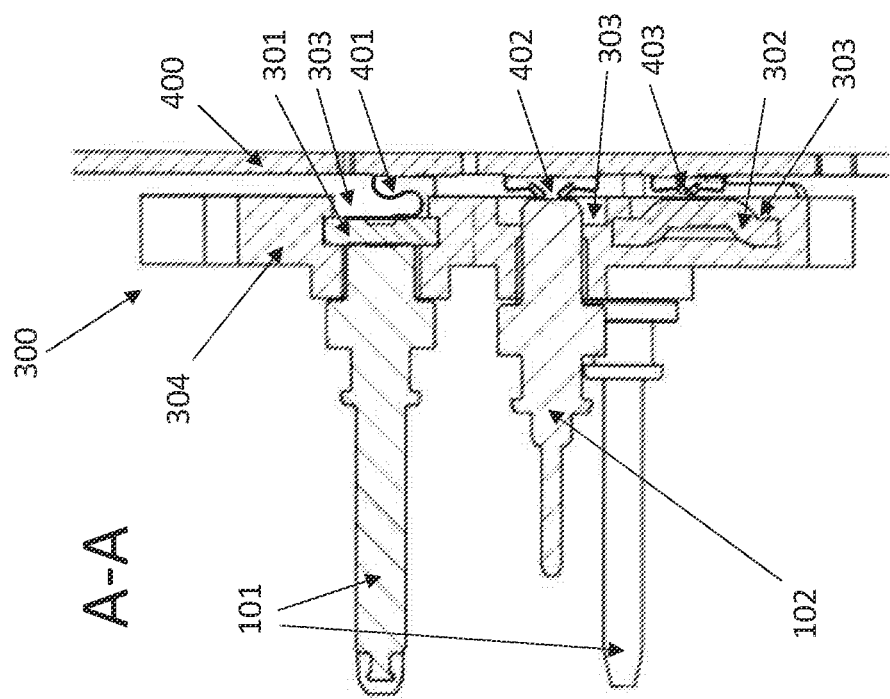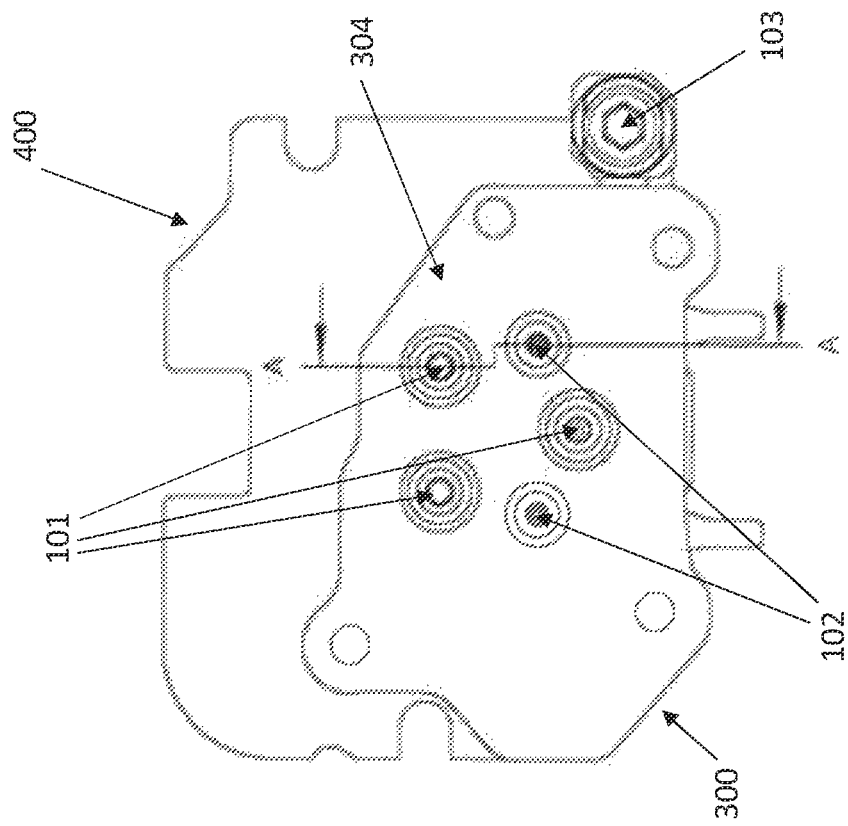

CHARGING SOCKET WITH INTERFACE

CROSS-REFERENCE TO PRIOR APPLICATION

Priority is claimed to German Patent Application No. DE 10 2020 123 476.7, filed on Sep. 9, 2020, the entire disclosure of which is hereby incorporated by reference herein.

FIELD

The invention relates to a plug socket.

BACKGROUND

Plug sockets or charging sockets are known from the prior art in various embodiments, for example as electromechanical components for the electromobility application field.

For example, DE 10 2018 124 821 describes a plug connector part of a charging socket or a charging plug for charging an electrically driven vehicle. The plug connector part is hereby positively fastened to a housing via two assembly steps or assembly positions, by means of a locking frame and corresponding latching elements and latching points, in order to prevent a release.

DE 20 2015 009 02 discloses a charging socket having a connector face which comprises an illumination module that can be attached to the housing of the charging socket, to the side of the connector face.

DE 10 2013 108 484 discloses a charging socket with protective plugs specifically attachable to connector face portions, wherein a pivotably mounted pawl is used for locking or unlocking the protective plugs.

Plug sockets, or primarily charging sockets in the field of electrical mobility, must fulfill a plurality of different tasks and requirements. In addition to the transmission of electrical energy, i.e. load current for charging accumulators of an electrically drivable vehicle as a primary task, primarily functions for securing, monitoring, and regulation during a charging process must also be realized via the charging socket. For example, the realization of the temperature measurement of the conducting path of the load lines would be desirable in order to be able to thermally monitor load current-carrying paths.

In addition, for example, primarily the mechanical design and thus the ability to install the charging socket also play an important role. On the one hand, conductor routing is to be mentioned here. Given charging sockets, there is often an AC branch (alternating current branch) and a DC branch (direct current branch) with conventional cabling. The charging socket is hereby firmly connected to the wiring harness. Given a defect of the charging socket, the part of the wiring harness that is fixedly connected to the charging socket must thus also be replaced. The same also applies to signal contacts and grounding contacts, or signal lines and grounding lines, in which wiring by means of individual lines, i.e. individual conductors, is likewise to be found.

This is similarly true of other plug contacts of the charging socket which carry no load current. These include, for example, signal contacts with electrical connections to the internal electronics of the charging socket, or PE contacts (grounding contacts/grounding conductors) with a separate ground connection. Here, conventional wiring has so far been effected by means of individual lines, i.e. individual conductors.

SUMMARY

In an embodiment, the present invention provides a plug socket, comprising: a first connector face for connecting a plug configured to transmit electrical energy and/or electrical signals via at least one contact element; and a second connector face having at least one contact assembly which is fastenable or is detachably fastenable thereto, and which has the at least one contact element, and/or via which the electrical energy and/or the electrical signals is transmittable by at least one electrical line.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 3A is a perspective view of a contact assembly;

FIG. 3B is a perspective view of a circuit board assembly;

FIG. 3C is a perspective view of a plug connector for a wiring harness end portion;

FIG. 3D is a perspective view of an end portion of a wiring harness;

FIG. 5A is a perspective view of the contact assembly shown in FIG. 3A;

FIG. 5B is a further perspective view of the contact assembly shown in FIG. 3A;

FIG. 5C is a further perspective view of the contact assembly shown in FIG. 3A;

FIG. 7A is a front view of the contact assembly shown in FIGS. 3A and 3B, with contacting circuit board assembly;

FIG. 7B is a side view (sectional view) of the contact assembly, with contacting circuit board assembly from FIG. 7A;

DETAILED DESCRIPTION

Figure 1B:
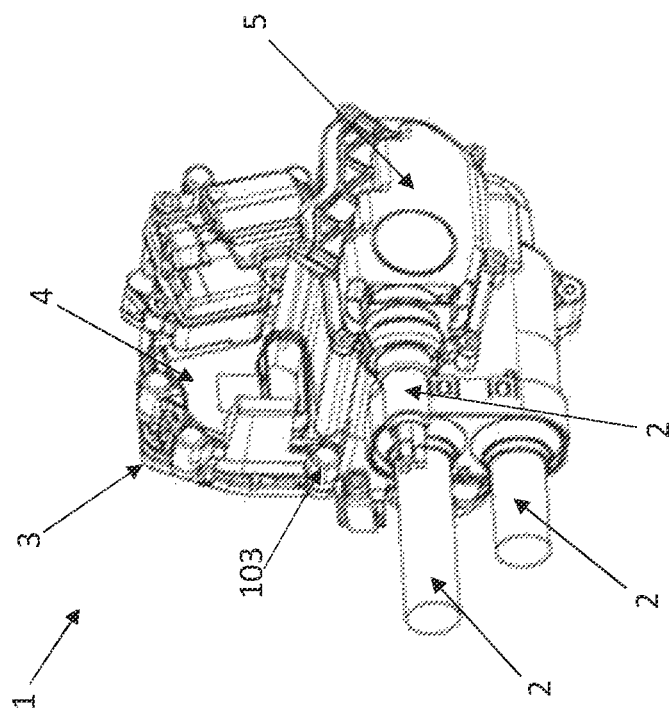
FIG. 1B is a perspective view of the rear side of the plug socket shown in FIG. 1A.

In at least one embodiment, the present invention provides an improved plug socket or charging socket, preferably for the electromobility application field.

According to a first general aspect, the invention relates to a plug socket, preferably a charging socket for an electrically drivable vehicle (electric vehicle, hybrid vehicle etc.), having a first connector face for connecting a plug, preferably a charging plug, for transmitting electrical energy and/or electrical signals via at least one plug contact or via at least one contact element which is preferably arranged in at least one first plug portion of the first connector face, and having a second connector face or a receiving portion having at least one contact assembly which can be fastened or is detachably fastened thereto or therein, which at least one contact assembly has the at least one plug contact or the at least one contact element, and/or via which the electrical energy and/or the electrical signals can be transmitted by means of at least one electrical line, preferably by means of a wiring harness.

The first connector face can, for example, be designed for a positive connection of the plug, preferably for a detachable plug connection with the plug.

The plug can, for example, be operatively connected, via at least one electrical line, or preferably via a cable or a wiring harness having a plurality of electrical conductors, to an electrical power source and/or to a control/regulating unit for transmitting electrical power and/or electrical signals.

The electrical energy can, for example, be transmitted as a load current in the form of alternating current and/or in the form of direct current.

The electrical signals may comprise signals for control and/or regulation, and/or sensor data.

The plug socket can, for example, be designed as a combined AC/DC charging socket for charging the electrically drivable vehicle.

The at least one contact assembly may, for example, be designed as a further or separate plug connector which can be produced separately from, i.e. discretely and independently of, the plug socket housing.

The at least one contact element or the at least one plug contact can, for example, be designed as a high-voltage contact element or as a high-voltage plug contact for the transmission of load current.

The at least one electrical line can preferably be designed as a sheathed line and comprise at least one wire, i.e. at least one insulated electrical conductor.

The at least one contact assembly can preferably be, or can be designed to be, positively inserted, at least in portions, into the second connector face or into the second receiving portion, preferably in a translational manner. The plug connection can be designed to be detachable, for example.

The plug socket can additionally be configured in such a way that it can be installed on a vehicle, preferably on the vehicle body of the vehicle.

With the at least one contact assembly, for example, a separate interface is provided between a first housing part of the charging socket for receiving the plug and a second housing part of the charging socket for connecting, or connection with, at least one electrical conductor. In the event of a defect or damage to respective regions or portions of the charging socket, for example, the entire charging socket thus does not need to be disassembled and/or replaced. A capability for modular installation and uninstallation is preferably ensured by the at least one contact assembly.

According to a further aspect of the invention, it can be provided that the first connector face and the second connector face are arranged at a distance from each other, wherein the first connector face is preferably arranged substantially oppositely or obliquely or orthogonally spaced apart from the second connector face.

In other words, the first connector face and the second connector face can, for example, be spaced apart from one another and/or be arranged relative to one another in such a way that different plug-in directions for the plug and the at least one contact assembly result therefrom.

It is possible for the first connector face and the second connector face to have a substantially identical contour or at least a similar contour in one view, preferably in a plan view, at least in portions.

A simple installation of the at least one contact assembly is thereby ensured. Furthermore, additional components and elements which are explained in more detail below can thereby be arranged on the at least one contact assembly, for example.

According to a further aspect of the invention, it can be provided that the at least one contact assembly is plate-shaped at least in portions, and/or is sandwich-like at least in portions, and/or has at least one recess.

A carrier base of the at least one contact assembly can preferably be plate-shaped and/or sandwich-like. For example, a compact design and a simple, preferably automated or automatic, installation capability of the at least one assembly is therewith ensured.

The at least one contact assembly, i.e. a carrier base of the at least one contact assembly, can, for example, be of layered or sandwich-like design at least in portions, wherein layers of an insulator or insulating material preferably surround or enclose (electrically non-conductive) layers of a conductive material, i.e. electrically conductive material, at least in portions, and thus separate them from one another.

According to a further aspect of the invention, it can be provided that the at least one contact assembly is formed via at least one lamination process, sintering process, spraying process, and/or casting process with an insulating material, preferably a thermoplastic-based insulating material.

This ensures, for example, a simple production of the at least one contact assembly with a plurality of differently arranged and/or differently designed electrical conducting elements, such as sheet metal parts made of an electrically conductive material which are surrounded at least in portions by the insulating material.

According to a further aspect of the invention, it can be provided that the at least one contact assembly has the at least one contact element which is preferably formed by at least one portion of at least one sheet metal part of the at least one contact assembly, or is connected to at least one sheet metal part of the at least one contact assembly by means of a material connection.

For example, a compact and space-saving design of the at least one contact assembly can thereby be achieved.

The material connection can be a welded joint or a soldered joint, for example.

According to a further aspect of the invention, it can be provided that the at least one contact element is designed as a grounding contact element (PE contact).

The at least one contact assembly can hereby comprise a special connection or a special contacting, for example.

It is possible for the at least one contact assembly to comprise at least one first sheet metal part and preferably at least one second sheet metal part for transmitting electrical energy and/or electrical signals, wherein the at least one first sheet metal part and/or the at least one second sheet metal part is/are preferably flat at least in portions and/or is/are annular or arcuate at least in portions.

For example, the at least one first sheet metal part and the at least one second sheet metal part thereby can be integrated or arranged, at least in portions, into or within a carrier base of the at least one contact assembly which, for example, leads to a more compact design of the at least one contact assembly.

The at least one first sheet metal part and/or the at least one second sheet metal part can preferably be designed as a conductive path sheet metal part for a load current.

According to a further aspect of the invention, it can be provided that the at least one first sheet metal part and the at least one second sheet metal part are arranged at a distance from one another, preferably lying at least in portions in one plane.

In other words, the at least one first sheet metal part is preferably positioned or arranged relative to the at least one second sheet metal part in such a way that they do not contact one another. The surrounding insulating material can, at least in portions, produce the function of mechanically fixing the at least one first sheet metal part and the at least one second sheet metal part, for example.

It is possible that the at least one first sheet metal part and/or the at least one second sheet metal part has the at least one contact element, or forms it at least in portions.

Further or additional components and elements can thereby be avoided, for example, which preferably leads to a reduced number of components of the charging socket.

According to a further aspect of the invention, it can be provided that the at least one first sheet metal part and the at least one second sheet metal part are formed from a conductive material, i.e. an electrically conductive material, preferably from a metallic material.

The conductive material may preferably be an electrically conductive material such as copper or a copper alloy, for example.

It is also possible, for example, that the at least one contact assembly contacts a circuit board assembly, preferably in the region of or within the second connector face, preferably via at least one spring element for temperature measurement and/or via at least one signal contact point for signal detection and/or via at least one sheet metal part contact point for load current transmission or discharge of electrical currents (current discharge line), which is respectively arranged on the circuit board assembly and contacts the at least one contact assembly, preferably the at least one contact element or the at least one sheet metal part, at least in portions.

The at least one spring element can preferably be a mechanical spring element, such as a spiral spring or an S-shaped metal spring.

According to a further aspect of the invention, it can be provided that the printed circuit board assembly is plate-shaped at least in portions.

A compact design of the circuit board assembly is thereby ensured, for example.

According to a further aspect of the invention, it can be provided that the circuit board assembly has at least one recess for passing or leading through at least one plug connection and/or exposing at least one portion of the at least one contact assembly.

For example, a portion of a sheet metal part and/or of a contact element can be accessible via the at least one recess.

According to a further aspect of the invention, it can be provided that the circuit board assembly is fastenable or fastened to the contact assembly at least in portions, preferably via at least one positive and/or non-positive connection.

In other words, the circuit board assembly can contact the contact assembly not only via spring elements, signal contact points, and/or sheet metal part contact points, but can additionally also be designed in such a way that it is fastenable or fastened to the contact assembly.

It is possible that the circuit board assembly is fastenable or fastened to the contact assembly via at least one plug connection and/or clamping connection with a receiving pin, projection, and/or latching element.

The circuit board assembly can preferably be joined or pressed to the contact assembly with the aid of ultrasound.

The number of components or elements in the tolerance chain, for example in the plug-in direction, is thereby reduced or minimized, meaning that fewer shape tolerances and/or position tolerances need to be observed. Furthermore, for example by fastening the circuit board assembly to the contact assembly, the transmission of compressive forces and/or tensile forces to the circuit board assembly is coupled to the behavior, for example the deformation, of the contact assembly.

It is possible that the at least one electrical line is fastenable or detachably fastened to the at least one contact assembly, preferably to the at least one contact element, preferably via at least one plug connection.

On the one hand, this enables, for example, a compact design of the socket and, on the other hand this ensures a simple installation and interchangeability of respective components if necessary.

According to a further aspect of the invention, it can be provided that the at least one contact assembly has at least one first contact element and at least one second contact element which extend in opposite directions, and/or wherein the at least one first contact element is cylinder- or pin-shaped at least in portions, and/or the at least one second contact element is plate-shaped, fork-shaped, or comb-shaped at least in portions.

According to a further aspect of the invention, it can be provided that the at least one contact assembly is designed to be translationally inserted into the second connector face or is translationally inserted so as to be detachable, preferably via an automatic or automated installation process.

For example, a machine-based installation of the plug socket by means of programmable robots is thereby enabled, which leads to an automatic or automated production process portion, i.e. an assembly process.

It is possible that the plug socket has an AC contact region and/or a DC contact region, wherein the AC contact region is preferably formed by the at least one contact assembly and a circuit board assembly.

Furthermore, it is possible that the first connector face and the second connector face form regions of a plug connection housing part of the plug socket which is formed, preferably is integrally formed in one piece, from an insulating material, preferably an insulating material based on a thermoplastic.

The plug is hereby preferably introduced or inserted into the first connector face of the plug connection housing part, and thus forms a detachable plug connection with the charging socket.

According to a further aspect of the invention, the plug socket can also act as a plug which preferably comprises a contact assembly and/or circuit board assembly as disclosed herein.

Identical or functionally equivalent components or elements are identified by the same reference signs in Figures.

For their explanation, reference is also made in part to the description of other exemplary embodiments and/or Figures, in order to avoid repetitions.

The following detailed description of the embodiments illustrated in Figures serves for more detailed illustration or clarification, and is not intended to limit the scope of the invention in any way.

Figure 1A:
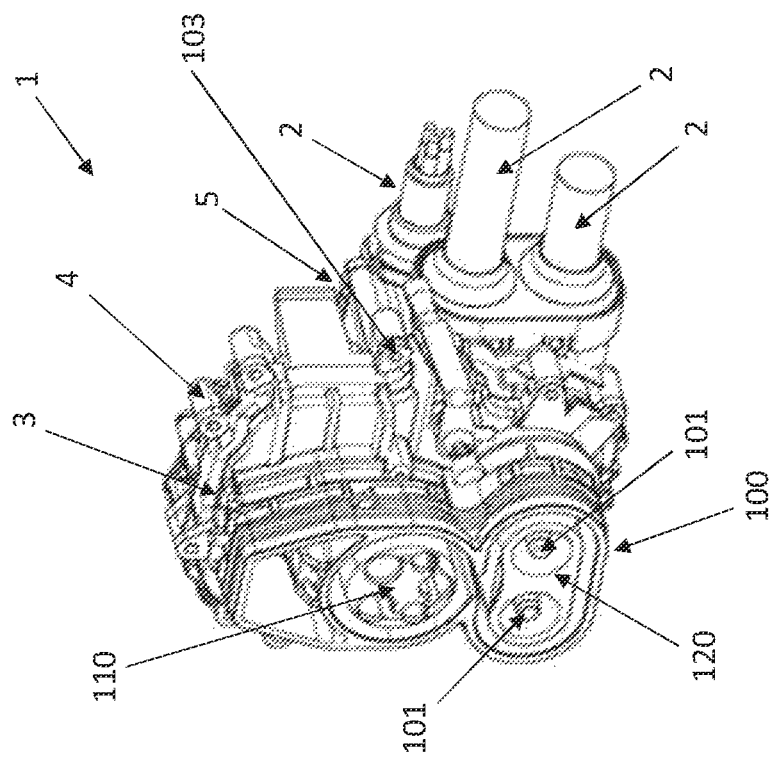
FIG. 1A is a perspective view of the front side (plug side) of an exemplary embodiment of the socket in the assembled state.

FIG. 1A shows a perspective view of the front side (plug side) of an exemplary embodiment of the plug socket 1, in the assembled state.

The plug socket 1 comprises a first connector face 100 for receiving or connecting a plug, preferably a combined charging plug (not shown in FIG. 1A) for a combined charging process by means of alternating current and direct current. The plug forms a detachable plug connection with the connector face 100 in order to transmit electrical energy as a load current in the form of alternating current or in the form of direct current, and/or electrical signals.

The plug socket 1 is preferably arranged on or installed at an electrically drivable vehicle (electric vehicle, hybrid vehicle etc.), i.e. preferably on the vehicle body of the electrically drivable vehicle (not shown in FIG. 1A).

The connector face 100 is hereby a component of the plug connection housing part 3 of the plug socket 1, and comprises a first plug portion 110 having an AC contact region and a second plug portion 120 having a DC contact region.

In the second plug portion 120 of the first connector face 100 of the plug socket 1, contact elements 101 as load contact elements for transmitting electrical energy are shown, i.e. arranged, in cylindrical or cylinder-shaped recesses. The contact elements 101 have a cylindrical or pin-shaped design.

The contact elements 101 can preferably be designed as high-voltage contact pins for transmitting electrical energy in the form of direct current in order to charge the energy stores of an electrically drivable vehicle (not shown in FIG. 1A), for example at a fast charging station (not shown in FIG. 1A) according to the high power DC charging process.

Corresponding contact elements 101 for transmitting electrical energy, preferably in the form of alternating current, and/or electrical signals are also provided in the first plug portion 110 of the first connector face 100 of the plug socket 1, but are not shown visibly in FIG. 1A. Electrical energy in the form of alternating current can be transmitted via such contact elements 101 in the first plug portion 110, for example with relatively low power according to the AC charging method.

Located on the rear side of the plug connection housing part 3 is a first conductor connection housing part 4 of the plug socket 1 which is detachably but fixedly connected to the plug connection housing part 3, for example via screw connections and/or clamped connections by means of latching elements (not shown in FIG. 1A).

The conductor connection housing part 4 comprises two inputs for two electrical lines 2 in the form of cables which preferably serve to transmit electrical energy and are operatively connected to the first plug portion 110 (AC plug portion) and the second plug portion 120 (DC plug portion).

A second conductor connection housing part 5, which likewise has an input for an electrical line 2 in the form of a cable, preferably for transmitting electrical signals, is in turn detachably fastened to the first conductor connection housing part 4. It is hereby well apparent that the electrical line 2 is designed as a multi-wire cable.

A contact element 103 in the form of a grounding contact element (PE contact) is arranged laterally between the plug connection housing part 3 and the first conductor connection housing part 4. This contact element 103 is hereby arranged on or at a carrier base 304 of a contact assembly 300 (see in this regard FIG. 3A, for example).

FIG. 1B shows a perspective view of the rear side of the plug socket 1 shown in FIG. 1A. The second conductor connection housing part 5 with the multi-wire electrical line 2 for transmitting electrical signals, for example control signals and/or regulatory signals, measurement signals, monitoring signals etc., is hereby readily apparent.

The internal structure of the exemplary embodiment of the plug socket 1 according to the invention will now be described and explained in more detail with reference to the description of the following Figures.

Figure 2:
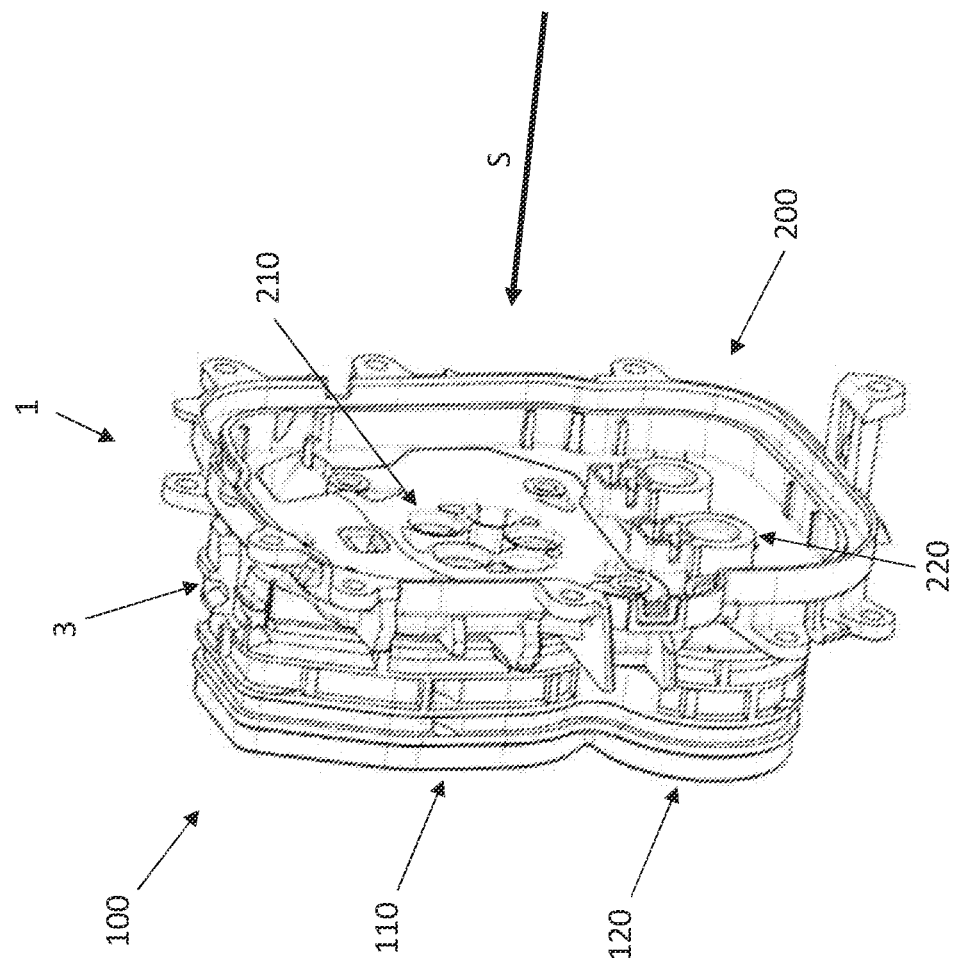
FIG. 2 is a perspective view of the plug connection housing part of the plug socket shown in FIGS. 1A and 1B.

FIG. 2 shows a perspective view of the plug connection housing part 3 of the plug socket 1 shown in FIGS. 1A and 1B. Instead of the first connector face 100, the rear, second connector face 200 with the first plug portion 210 and the second plug portion 220 is hereby readily apparent.

In a plan view of the first plug portions 110, 210 of the first and second connector faces 100, 200, and of the second plug portions 120, 220 of the first and second connector faces 100, 200, it can be seen that they have a substantially identical or at least similar contour, at least in portions.

The second connector face 200 is preferably delimited by a circumferential outer projection or portion of the plug connection housing part 3. The plug-in direction S, in which the contact assembly 300 (see in this regard the further FIG. 4, for example) can be inserted translationally into the second connector face 200, preferably the first plug portion 210 of the second connector face 200, is hereby represented with an arrow.

The second connector face 200 is configured and designed in such a way that the contact assembly 300, in the inserted state, positively contacts the connector face 200 at least in portions.

FIG. 3A shows a perspective view of a contact assembly 300 of the plug socket 1.

The contact assembly 300 comprises a plate-shaped carrier base 304. The carrier base 304 is produced via an injection molding process or a casting process, and comprises electrically conductive components and elements which are described in more detail below with reference to further Figures.

The electrically conductive components and elements are embedded and/or fixed at a distance from one another in an insulating material. The insulating material used for the injection molding or casting process can preferably be based on a thermoplastic material having appropriate rigidity and strength.

The carrier base 304 comprises a plurality of recesses 303 in the form of holes having a circular cross-section. Electrically conductive components and elements are accessible and can be contacted via the recesses 303.

On the one hand, contact elements 101, in the form of load-current contact elements or load-current plug elements, which are pin-shaped or cylindrical are formed projecting out of the carrier base 304 or projecting from the carrier base 304.

Furthermore, contact elements 102 projecting out of the carrier base 304 or projecting from the carrier base 304 are in the form of signal contact elements which are designed to be pin-shaped or cylindrical, as well as contact elements 104 in the form of load-current contact elements and/or signal contact elements which are plate-shaped and/or fork-shaped and which extend in the direction opposite to the contact elements 101 and the contact elements 102.

The already addressed grounding contact element 103 is arranged on the carrier base 304, in the edge region of the carrier base 304.

FIG. 3B shows a perspective view of a circuit board assembly 400.

The circuit board assembly 400 is preferably plate-shaped and/or flat. It comprises a recess 405 which is adapted to the arrangement of the plate-shaped and/or fork-shaped contact elements 104 of the carrier base 304 of the contact assembly 300. Further components and elements of the circuit board assembly 400 are described in more detail with reference to further Figures.

FIG. 3C shows a perspective view of a plug connector 500 for receiving an end portion of a wiring harness 600 having a plurality of electrical lines 2 (see FIG. 3D) for connecting the electrical lines 2 of the wiring harness 600 to the plate-shaped and/or fork-shaped contact elements 104 of the carrier base 304 of the contact assembly 300.

The plug connector 500 is hereby preferably formed from sheet metal parts which are curved at least in portions and, corresponding to the arrangement of the plate-shaped or fork-shaped contact elements 104, comprises receiving portions for the respective electrical lines 2 for contacting the plate-shaped or fork-shaped contact elements 104 via clamping elements 601 (see FIG. 3D in this regard) at respective ends of the electrical lines 2.

FIG. 3D shows a perspective view of an end portion of a wiring harness 600 which comprises a plurality of electrical lines 2. The electrical lines 2 are preferably sheathed lines respectively having at least one wire. At the end of each electrical line 2, a plug element or a clamping element 601 is mounted in order to connect or contact the respective electrical line 2, by means of a plug connection, with a respective plate-shaped and/or fork-shaped contact element 104 of the carrier base 304 of the contact assembly 300.

Figure 4:
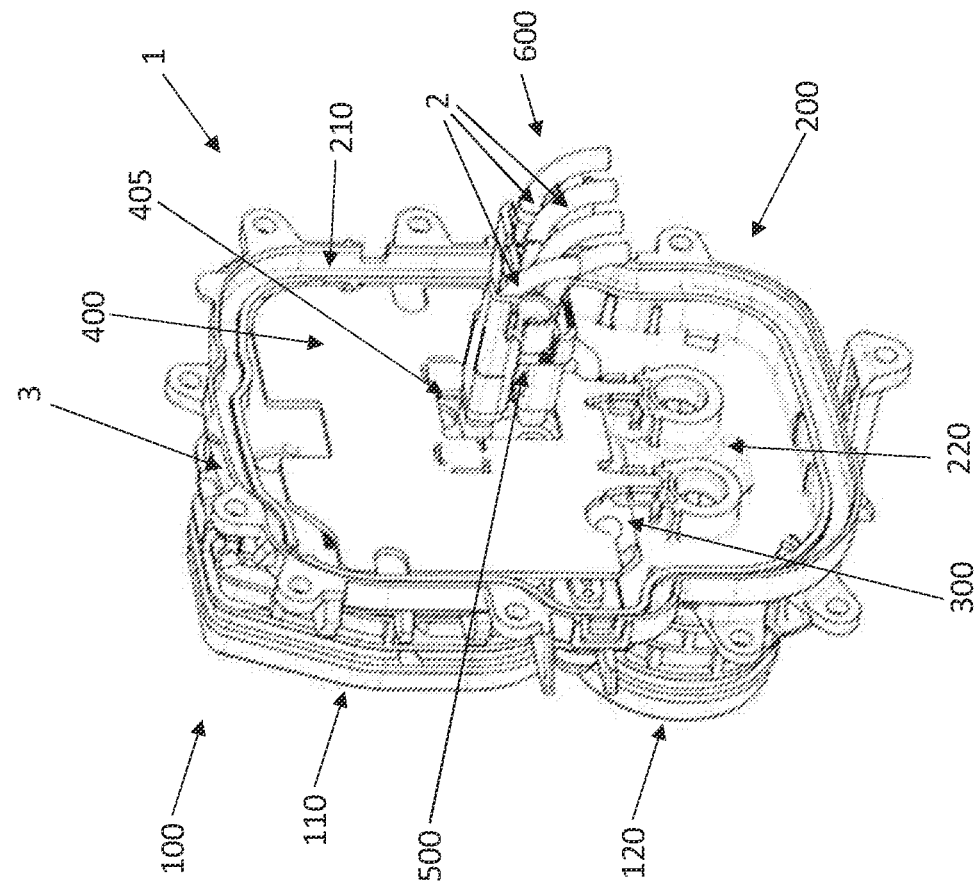
FIG. 4 is a perspective view of the plug connection housing part shown in FIG. 2, having the contact assembly shown in FIG. 3A and the circuit board assembly shown in FIG. 3B.

FIG. 4 shows a perspective view of the plug connection housing part 3 shown in FIG. 2 with the contact assembly 300 shown in FIG. 3A, the circuit board assembly 400 shown in FIG. 3B, the plug connector 500 shown in FIG. 3C, and the wire harness shown in FIG. 3D, in the installed, i.e. assembled, state.

For better illustration, the first conductor connection housing part 4 and the second conductor connection housing part 5 (see FIGS. 1A and 1B) are not shown in FIG. 4 (rear view of the open charging socket 1).

The contact assembly 300 and the circuit board assembly 400 are hereby plugged into or accommodated in, positively at least in portions, the second connector face 200, preferably into the first plug portion 210 of the second connector face 200, of the plug socket 1, i.e. of the plug connection housing part 3.

Furthermore, the wiring harness 600 is detachably connected via the plug connector 500 to the contact assembly 300, as already described, by means of a plug connection which is respectively formed by a contact element 104 and a clamping element 601 (not shown visibly in FIG. 4).

FIG. 5A shows a perspective view of the contact assembly 300 shown in FIG. 3A.

The carrier base 304 with the protruding contact elements 101 (load-current contact elements), as well as the contact elements 102 (signal contact elements) and the contact element 103 (grounding contact element) arranged laterally next to the carrier base 304, are readily apparent.

As already described, the carrier base 304 is plate-shaped and produced via an injection molding process or casting process using an injectable or pourable insulating material, preferably thermoplastic-based.

The outer contour of the carrier base 304 is formed at least in portions similar to the first plug portion 210 of the first connector face 200, in order to allow the carrier base 304, and thus the contact assembly 300, to positively contact the first connector face 200 in the inserted state.

FIG. 5B shows a further perspective view of the contact assembly 300 shown in FIG. 3A.

The further contact elements 104, which, in comparison to the contact elements 101 and 102, are located on the other side of the carrier base 304, are already visible herein.

FIG. 5C shows a further perspective view of the contact assembly 300 shown in FIG. 3A. In addition to the contact elements 104, recesses 303 on or in the carrier base 304 are also readily apparent.

Portions of contact elements 101, 102, and electrically conductive elements, i.e. conductor elements, located within the carrier base 304, are accessible via the recesses 303, which preferably have a circular cross-section.

The structure of the carrier base 304, and thus of the contact assembly 300, is described in more detail below with reference to further Figures.

Figure 6:
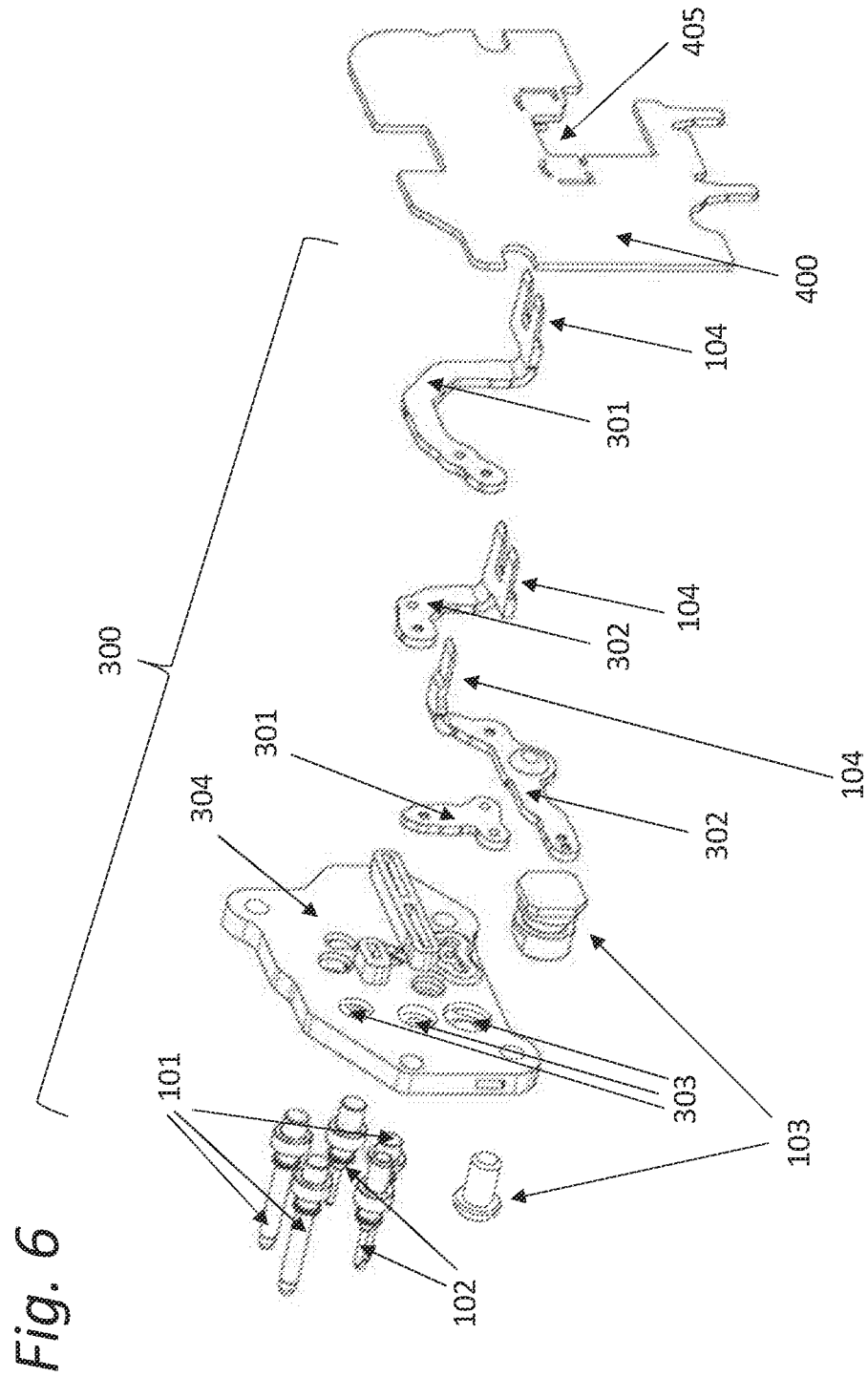
FIG. 6 is an exploded view of the contact assembly shown in FIG. 3A, and a perspective view of the circuit board assembly shown in FIG. 3B.

FIG. 6 shows an exploded view of the contact assembly 300 shown in FIGS. 3A and 5A to 5C. Furthermore, FIG. 6 shows a perspective view of the circuit board assembly 400 shown in FIG. 3B.

In addition to the contact elements 101, 102 for load current and signals, as well as the already mentioned grounding contact element 103, the first and second sheet metal parts 301, 302 arranged within the carrier base 304 of the contact assembly 300 are primarily apparent as further electrically conductive elements, i.e. contact elements.

The first and second sheet metal parts 301, 302 are flat at least in portions for receiving or integrating in the plate-shaped carrier base 304. Furthermore, in one view some of the first and second sheet metal parts 301, 302 have an arcuate or annular shape or contour, at least in portions. Similar to the principle given circuit boards with conductor traces, the first and second sheet metal parts 301, 302 can, due to their geometric design, be arranged and integrated into the carrier base 304 in such a way that they do not contact each other.

The first and second sheet metal parts 301, 302 are formed from an electrically conductive material, preferably from a metallic material, such as copper or a copper alloy.

The first and second sheet metal parts 301, 302 are preferably extrusion-coated or encapsulated with insulating material during the manufacturing process of the carrier base 304, and thus remain in a defined position within the carrier base 304. The carrier base 304 therefore has, at least in portions, a sandwich-like design due to insulating material and sheet metal parts 301, 302.

Furthermore, it can be seen from the exploded view of the contact assembly 300 in FIG. 6 that some of the first and second sheet metal parts 301, 302 have a correspondingly molded contact element 104. As already described, such a contact element 104 can have a plate-shaped, fork-shaped, or comb-shaped design or contour.

FIG. 7A shows a front view of the contact assembly 300 shown in FIGS. 3A and 3B, with contacting circuit board assembly 400 in the background.

A detailed description of the identical and explained components and elements already shown with reference to previous Figures is dispensed with at this point in order to avoid repetitions.

FIG. 7B shows a side view of the contact assembly 300 with contacting circuit board assembly 400 from FIG. 7A (sectional view of section A-A in FIG. 7A).

Clearly apparent from FIG. 7B in turn are the cylindrical or pin-shaped contact elements 101, 102 for transmitting load current and signals, which contact elements 101, 102 are received at least in portions at corresponding regions in the carrier base 304 of the contact assembly 300 and contact first and/or second sheet metal parts 301, 302, i.e. are operatively connected and thus have an electrically conductive connection.

The load-current contact element 101 shown in sectional view contacts the first sheet metal part 301 or has a material connection to the first sheet metal part 301. The material connection can be a welded connection or soldered connection, for example. Alternatively, the load-current contact element 101 can also be connected to the first sheet metal part 301 via a plug connection or a clamping connection.

The load-current contact element 101 shown in sectional view is operatively connected to the circuit board assembly 400 via the first sheet metal part 301 and a spring element 401 contacting the first sheet metal part 301. In this view, the spring element 401 is S-shaped and is pretensioned, i.e. charged with an initial tension, to contact the first sheet metal part 301.

The spring element 401 is arranged on that side of the circuit board assembly 400 which faces toward the contact assembly 300.

Thermo-sensing, i.e. a temperature sensing of the contact element 101 as a load-current contact element, can preferably take place via the spring element 401. As a whole, a thermal monitoring of the plug socket 1 can thus be ensured and, for example, overheating of the plug socket 1 can be prevented, preferably during the charging process.

In the sectional view in FIG. 7B, it is also apparent that the signal contact element 102 directly contacts, i.e. contacts in an electrically conductive manner, a signal contact point 402 of the circuit board assembly 400 through or within the recess 303 of the carrier base 304.

In addition, it can be learned from FIG. 7B that the second sheet metal part 302 directly contacts, i.e. contacts in an electrically conductive manner, a sheet metal part contact point 403 of the circuit board assembly 400 through or within the recess 303.

The circuit board assembly 400 is substantially plate-shaped.

Figures 8A, 8B, 8C:
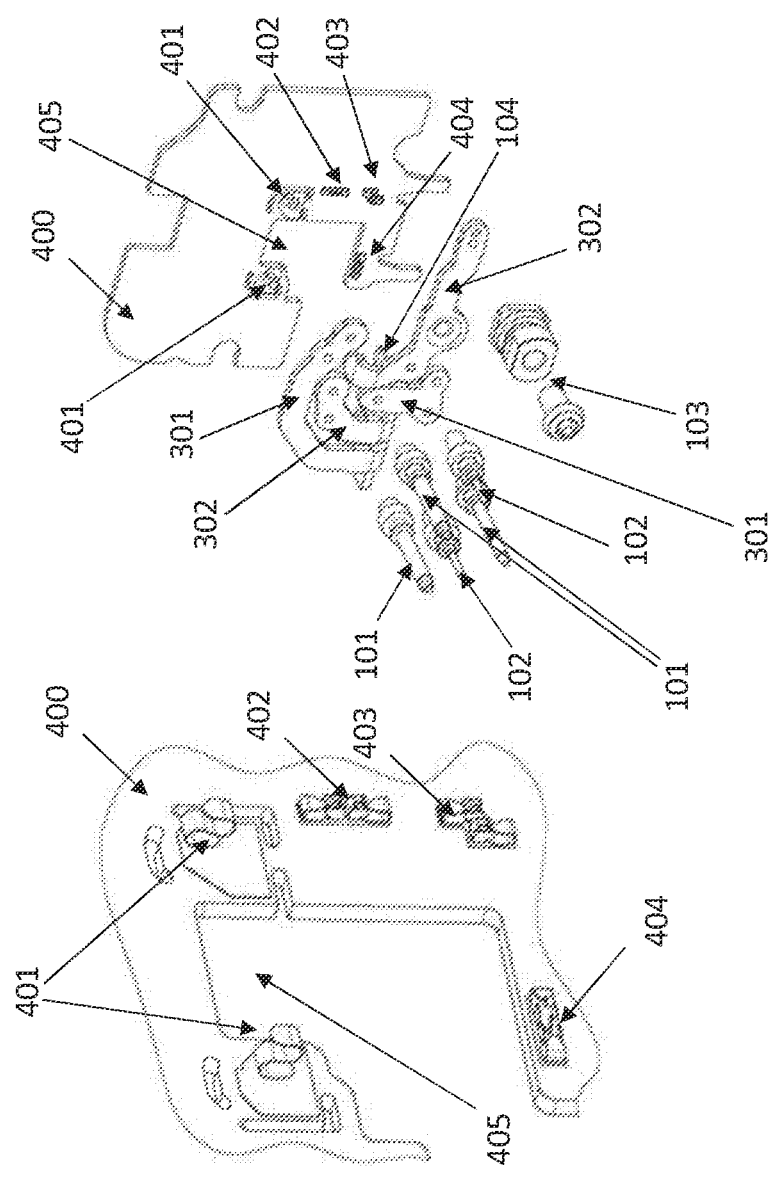
FIG. 8A is a perspective view of the circuit board assembly shown in FIG. 3A.
FIG. 8B is an enlarged view of a partial region of the circuit board assembly shown in FIG. 8A.
FIG. 8C is a further perspective view of the circuit board assembly shown in FIG. 8A, with contacting components of the contact assembly, in an exploded view.

FIG. 8A shows a perspective view of the circuit board assembly 400 shown in FIG. 3A.

The spring elements 401 arranged on the side of the circuit board assembly 400 facing toward the contact assembly 300, as well as the signal contact point 402, the sheet metal part contact point 403, and a further contact point 404 of the circuit board assembly 400 for contacting a contact element 101, 102 and/or a sheet metal part 301, 302 of the contact assembly 300, are readily apparent.

FIG. 8B shows an enlarged view of a portion of the circuit board assembly 400 depicted in FIG. 8A, with the components and elements already described.

FIG. 8C shows a further perspective view of the circuit board assembly 400 shown in FIG. 8A, with contacting components of the contact assembly 300, in an exploded view.

The load-current contact elements 101, the signal contact elements 102, the grounding contact element 103, and the first and second sheet metal parts 301, 302 with the molded-on contact elements 104 are hereby again shown in an exploded view. For better illustration, the insulating material of the carrier base 304 is not shown in FIG. 8C.

Figure 9A:
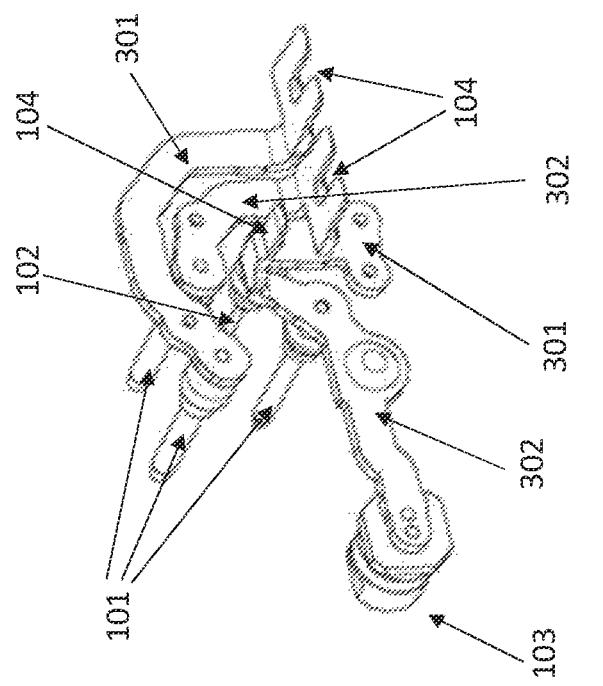
FIG. 9A is a perspective view of the contact assembly shown in FIGS. 5A to 5C, without insulating material.
Figure 9B:
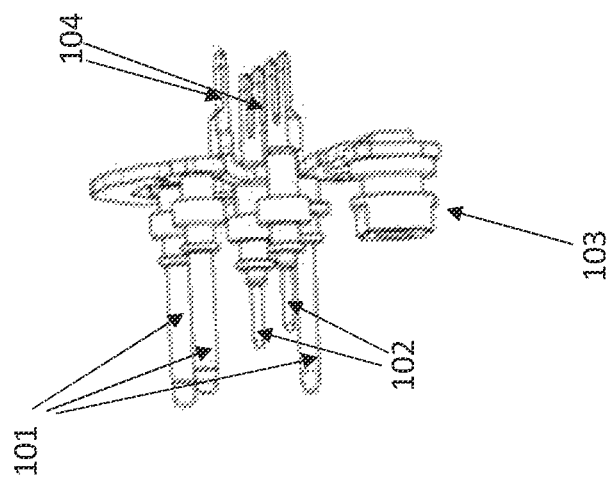
FIG. 9B is a further perspective view of the contact assembly shown in FIGS. 5A to 5C, without insulating material.
Figure 9C:
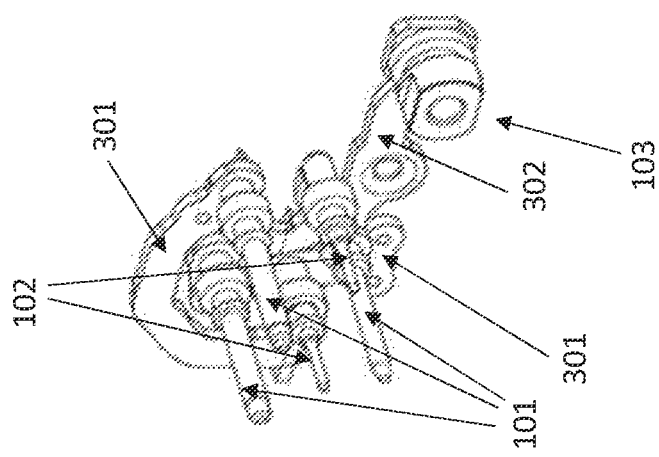
FIG. 9C is a further perspective view of the contact assembly shown in FIGS. 5A to 5C, without insulating material.

FIGS. 9A to 9C show various perspective views of the contact assembly 300 depicted in FIGS. 5A to 5C, without insulating material, i.e. the contact elements 101, 102, 103 and 104 arranged at least in portions within the insulating material of the carrier base 304, as well as first and second sheet metal parts 301, 302.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SYMBOLS

1 Plug socket
2 Electrical line
3 Plug connection housing part
4 First conductor connection housing part
5 Second conductor connection housing part
100 First connector face
101 Contact element, load-current contact element
102 Contact element, signal contact element
103 Contact element, grounding contact element (PE contact)
104 Contact element, load-current contact element, signal-current contact element
110 First plug portion of the first connector face (AC plug portion)
120 Second plug portion of the first connector face (DC plug portion)
200 Second connector face
210 First plug portion of the second connector face (AC plug portion)
220 Second plug portion of the second connector face (DC plug portion)
300 Contact assembly
301 First sheet metal part
302 Second sheet metal part
303 Recess
304 Carrier base
400 Circuit board assembly
401 Spring element
402 Signal contact point
403 Sheet metal part contact point 404 Contact point
405 Recess
500 Plug connector
600 Wiring harness
601 Clamping element
S Plug-in direction/assembly direction

What is claimed is:

1. A plug socket, comprising:
a first connector face for connecting a plug configured to transmit electrical energy and/or electrical signals via at least one contact element;
a second connector face having at least one contact assembly which is fastenable or is detachably fastenable thereto, and which has the at least one contact element, and/or via which the electrical energy and/or the electrical signals is transmittable by at least one electrical line; and
a carrier base,
wherein the at least one contact element includes at least one portion of an at least one sheet metal part of the at least one contact assembly, or is connected by a material connection to at least one sheet metal part of the at least one contact assembly,
wherein the at least one sheet metal part is flat at least in portions for receiving or integrating in the carrier base,
wherein the at least one contact assembly comprises at least one first sheet metal part and at least one second sheet metal part configured to transmit electrical energy and/or electrical signals,
wherein the at least one first sheet metal part and/or the at least one second sheet metal part has the at least one contact element, or forms the at least one contact element at least in portions,
wherein the at least one contact assembly contacts a circuit board assembly, and
wherein the circuit board assembly has at least one recess configured to pass through a plug connection to expose a portion of the at least one contact assembly.

2. The plug socket of claim 1, wherein the first connector face and the second connector face are arranged at a distance from one another.

3. The plug socket of claim 1, wherein the first connector face and the second connector face have at least a similar contour, at least in portions, in a view.

4. The plug socket of claim 1, wherein the at least one contact assembly is plate-shaped at least in portions, and/or is sandwich-like at least in portions, and/or has at least one recess.

5. The plug socket of claim 1, wherein the at least one contact assembly is formed via at least one of a lamination operation, a sintering operation, an injection molding operation, and/or a casting operation with an insulating material.

6. The plug socket of claim 1, wherein the at least one contact element comprises a grounding contact element.

7. The plug socket of claim 1, wherein the at least one first sheet metal part and the at least one second sheet metal part are arranged at a distance from one another.

8. The plug socket of claim 1, wherein the at least one first sheet metal part and the at least one second sheet metal part are formed from a conductive material.

9. The plug socket of claim 1, wherein the circuit board assembly is plate-shaped at least in portions.

10. The plug socket of claim 1, wherein the circuit board assembly is fastenable or is fastened to the contact assembly at least in portions.

11. The plug socket of claim 10, wherein the circuit board assembly is fastenable or is fastened to the contact assembly via at least one plug connection and/or a clamping connection with a receiving pin, a projection, and/or a latching element.

12. The plug socket of claim 1, wherein the at least one electrical line is fastenable or is detachably fastened to the at least one contact assembly.

13. The plug socket of claim 1, wherein the at least one contact assembly has at least one first contact element and at least one second contact element which extend in opposite directions, and/or
wherein the at least one first contact element is cylinder-shaped at least in portions, and/or
wherein the at least one second contact element is plate-shaped, fork-shaped, or comb-shaped at least in portions.

14. The plug socket of claim 1, wherein the at least one contact assembly is configured to be translationally insertable into the second connector face or is detachably inserted translationally.

15. The plug socket of claim 1, wherein the plug socket has an AC contact region and/or a DC contact region.

16. The plug socket of claim 1, wherein the first connector face and the second connector face form regions of a plug connection housing part of the socket which is formed from an insulating material.

17. The plug socket of claim 1, wherein the at least one contact element is arranged in at least one first plug portion of the first connector face.

18. The plug socket of claim 2, wherein the first connector face is arranged opposite or obliquely or orthogonally spaced apart from the second connector face.

* * * * *